(12) United States Patent
Ferguson (10) Patent No.: US 8,566,399 B2
(45) Date of Patent: Oct. 22, 2013

(54) METHOD AND SYSTEM FOR SYNCHRONIZING A DRAFTS FOLDER

(75) Inventor: Tabitha Ferguson, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 2339 days.

(21) Appl. No.: 10/787,925

(22) Filed: Feb. 27, 2004

(65) Prior Publication Data

US 2005/0193067 A1 Sep. 1, 2005

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| | | | | |
|---|---|---|---|---|
| 5,961,590 A * | 10/1999 | Mendez et al. | ............... | 709/206 |
| 6,052,735 A | 4/2000 | Ulrich et al. | | |
| 2004/0068567 A1 * | 4/2004 | Moran et al. | ................... | 709/227 |
| 2004/0205674 A1 * | 10/2004 | Delgado et al. | ............... | 715/536 |
| 2005/0033811 A1 * | 2/2005 | Bhogal et al. | ................. | 709/206 |

FOREIGN PATENT DOCUMENTS

| | | |
|---|---|---|
| CA | 2498025 | 8/2005 |
| EP | 1569147 | 8/2006 |
| WO | WO 01/78342 A3 | 10/2001 |

OTHER PUBLICATIONS

Communication under Rule 51(4) EPC Application No. 04 251159.2 Date: Apr. 10, 2006.
Hild, S. G. and Robinson, P. "Mobilizing Applications" IEEE Personal Communications, Oct. 1997, pp. 26-34, vol. 4, Issue 5.
Canadian First Office Action. Application No. 2,498,025. Dated: Apr. 23, 2008.
Search Report. European Patent Application No. 04251159.2. Dated: Jun. 17, 2004.
Exam Report. European Patent Application No. 04251159.2. Dated: Jul. 9, 2004.
Response. European Patent Application No. 04251159.2. Dated: Oct. 8, 2004.
Exam Report. European Patent Application No. 04251159.2. Dated: Dec. 16, 2004.
Response. European Patent Application No. 04251159.2. Dated: Apr. 14, 2005.
Summons to attend oral proceedings pursuant to Rule 71(1) EPC. European Patent Application No. 04251159.2. Dated: Oct. 7, 2005.

(Continued)

*Primary Examiner* — Phuoc Nguyen
*Assistant Examiner* — Kishin G Belani
(74) *Attorney, Agent, or Firm* — Bereskin & Parr LLP/S.E.N.C.R.L., s.r.l.

(57) ABSTRACT

A method and system for synchronizing a draft of an email is described. The system includes a computer device and a handheld device in communication with the computer device via a wireless communication network. The system further includes a saving module located in one or the other device to allow a user to save an email message therein as a draft. A sending module is located in the computer device (handheld device) for sending the draft therefrom to the handheld device (computer device). A send trigger module in the computer device (handheld device) issues instructions, which are unsolicited by the handheld device (computer device), that cause the sending module to send the draft from the computer device (handheld device) to the other device.

24 Claims, 5 Drawing Sheets (56) References Cited

OTHER PUBLICATIONS

Response. European Patent Application No. 04251159.2. Dated: Nov. 30, 2005.
Office Communication. European Patent Application No. 04251159.2. Dated: Feb. 28, 2006.
Provision of the minutes in accordance with Rule 76(4) EPC. European Patent Application No. 04251159.2. Dated: Apr. 4, 2006.
Decision to grant a European patent pursuant to article 97(2) EPC. European Patent Application No. 04251159.2. Dated: Jul. 27, 2006.
Office Action. Canadian Application No. 2,498,025. Dated: Mar. 9, 2009.
Notice of Allowance. Canadian Application No. 2,498,025. Dated: May 8, 2009.
Certificate of Grant. Hong Kong Application No. 06102279.2. Dated: Oct. 27, 2006.

* cited by examiner

METHOD AND SYSTEM FOR SYNCHRONIZING A DRAFTS FOLDER

FIELD OF THE INVENTION

The present invention relates to data communication, and more specifically relates to email communication using a handheld device.

BACKGROUND OF THE INVENTION

A person often uses several computer systems to process the same data. For example, at work, a user can utilize a desktop computer connected by a LAN to a company server to write and send an email to intended recipient. The user might choose to save a copy of the email on both the server and the desktop computer. On the way home, the user may utilize a mobile data communication device (handheld device) having a wireless link to the server to access the copy of the email. Finally, at home, the user may use a laptop computer to download (via a cable modem, for example) the email from the server. After modifying the email using the laptop computer, the user can send the modified email to a second intended recipient. The presence of a plurality of computer systems used to manage the same data presents unique problems that fall under the rubric of "synchronization." Synchronization systems and methods strive to efficiently manage and replicate the same data in various systems.

Such systems and methods for managing and replicating information, such as a draft of an email, from a host system, which can include a company server, to a handheld device typically store the draft on the host system for an indefinite period of time and then transmit in bulk only in response to a user request. When replication of the stored email draft to the handheld device is desired, the user typically places the handheld device in an interface cradle that is electrically connected to the host system via some form of local, dedicated communication link, whether physical, such as a serial cable, or wireless, such as by using infrared signals. Software executing on the handheld device then transmits commands via the local communication link to the host system to cause the host to begin transmitting the user's data to the handheld device.

In these synchronization schemes, the handheld device "pulls" the stored information from the host system in a batch each time the user desires to replicate information among the host system and the handheld device. Therefore, the two systems (host and handheld) only maintain the same data items after a user-initiated command sequence that causes the handheld device to download the data items from the host system.

The above methods and systems of synchronizing have several drawbacks. First, replicating information is contingent on the user remembering to perform some action for the purpose of synchronizing. If the user forgets to perform this action, no synchronization takes place. Second, with the current pull-based systems, the user must deal with the same email twice: on the handheld device and on the host system (e.g., desktop or server) at the office. When many emails have to be processed, this can prove to be quite a nuisance. For example, in e-mail systems where internal company mail and external Internet mail merge into one common mailbox, the average user can receive hundreds of pieces of electronic information a day in one location. As a result, once the user returns to the office, even though the user may have seen and read the mail on the handheld device while traveling, the user has to re-read the messages and then organize the information into folders based on the content. In such case, the handheld device does not lessen the amount of emails that have to be processed when the user returns to the office from a period of travel. Third, because traditional systems rely on a user action to pull data from the host system, emails may not be received in a timely fashion. Thus, if a user causes emails to be transmitted to the handheld device, five minutes later a new message could be sent to the user, but the user would not receive that message until the next time the user fetches the user data items. Thus, a user may fail to respond to an emergency update or message because the user only periodically synchronizes the system, such as once per day. Fourth, the amount of data to be synchronized between the host system and the handheld device can become large if the user does not synchronize on a daily or hourly basis. Large amounts of data lead to bandwidth difficulties, particularly when the handheld device is communicating via a wireless packet-switched network. Fifth, synchronizing the large amounts of data that can accumulate in typical batch-mode synchronization systems can require a great deal of communication between the host and the mobile device, thus leading to a more complex, costly and energy-inefficient system

SUMMARY OF THE INVENTION

The present invention is directed towards synchronizing information, such as an email draft, between a host system, where the information is normally stored, and a mobile data communication device (handheld device) in a manner that is more automated, continuous, efficient and reliable than the previous methods discussed above. As used herein, the term "draft" refers to an email file that has not yet been sent to a recipient. Such an email file may be further modified before being sent, or perhaps may be stored to send without further changes at a later date. The host system, upon sensing a particular user-defined event has occurred, redirects user-selected email drafts from the host system to the user's handheld device. Upon receiving this redirected email draft at the handheld device, the user can perform various operations on the email draft, such as modifying it or storing it in a folder. The results of these types of operations are then synchronized back to the original host system for replication. Automatically, the host system organizes the user's information into the same folder hierarchies (or replicates the other operations performed at the mobile device), thus saving the user from having to perform the operations a second time at the host system. The synchronization of the message operations can be performed in real-time as the operations are executed at the mobile device, or in a batch process when the mobile device is electrically coupled to the host system.

Instead of storing the user's email drafts at the host system and then synchronizing the handheld device with the host system when the handheld device requests that such email drafts be communicated to it, the present invention employs a "push" paradigm that continuously packages and retransmits the email drafts to the mobile data communication device in response to a triggering event detected at the host system. Wireless handheld devices, especially those that can return a confirmation signal to the host that the pushed data has been received are especially well suited for this type of push paradigm.

A system is provided herein that allows a draft of an email composed on a host system, such as a desktop, to be copied to a handheld device when the draft is saved on the desktop. Subsequent modifications to the draft, whether on the desktop or handheld device, are synchronized with the other device.

In particular, a method of synchronizing a draft of an email between a host system or computer device and a handheld device is described. The method includes saving an email message as a draft on one device that is either a computer device or a handheld device. The computer device is typically a desktop computer, but could include a larger device, such as a server on a network, or a smaller device, such as a laptop. The method further includes sending the draft from the one device to the other device in response to commands issued by the one device that are unsolicited by the other device, i.e., the draft is "pushed," not "pulled" to the other device.

In one embodiment, before the step of sending, a user is prompted to determine whether to send the draft from the device that was used to compose the draft to the other device. Every subsequent modification of the draft can be synchronized between the two devices.

A system is also described herein for synchronizing a draft of an email between a computer device and a handheld device. The system includes a computer device, and a handheld device in communication with the computer device via a wireless data communication network.

The system further includes a saving module located in one device that is either the computer device or the handheld device to allow a user to save an email message therein as a draft. The system further includes a sending module located in the one device (e.g., the computer device) for sending the draft therefrom to the other device (the handheld device), and a send trigger module in the one device for issuing instructions, which are unsolicited by the other device, that cause the sending module to send the draft from the one device to the other device. A prompt module in the one device can prompt the user to determine whether the send trigger module is to issue the instructions.

DETAILED DESCRIPTION OF THE INVENTION

Figure 1:
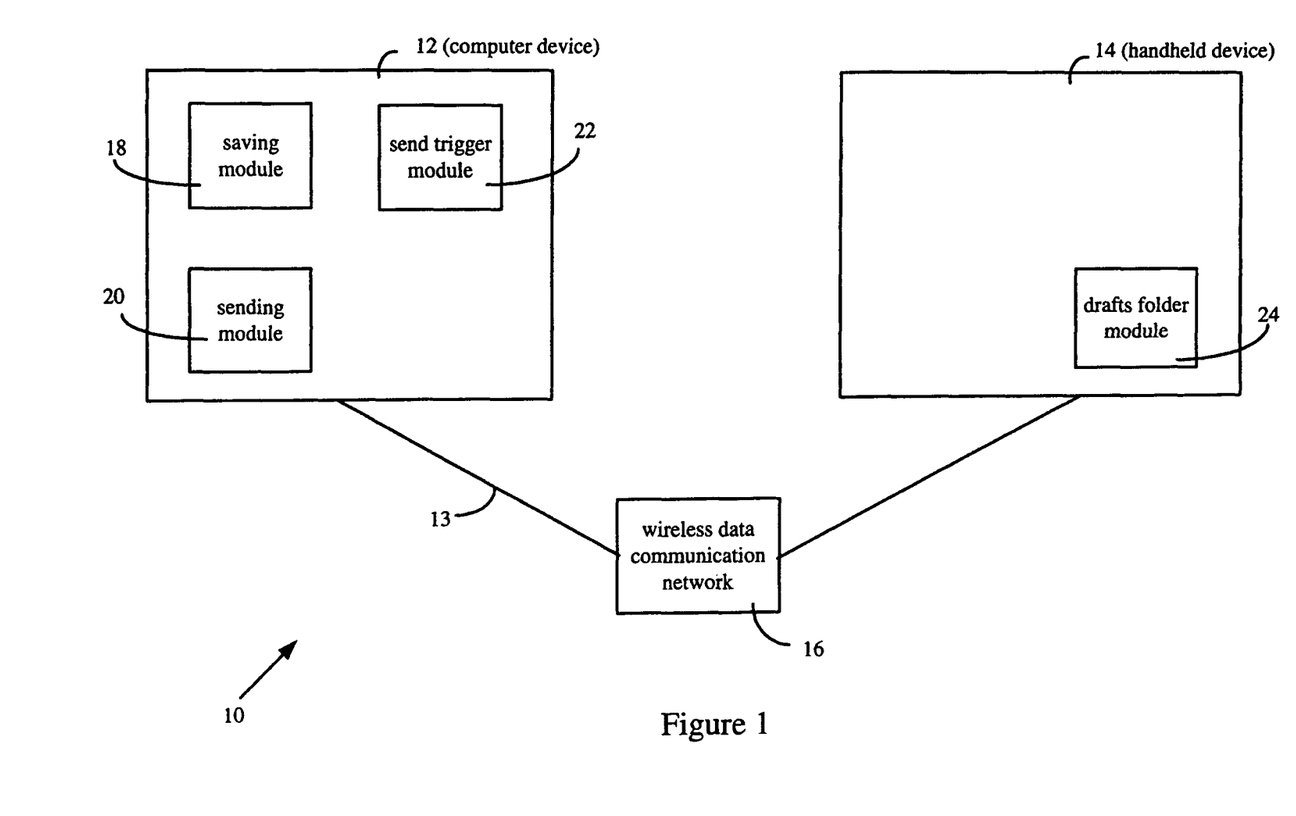
FIG. 1 shows a block diagram of a system for synchronizing a draft of an email.

FIG. 1 shows a block diagram of a system 10 for synchronizing a draft of an email. The system 10 includes a computer device 12 and a handheld device 14 in communication therewith via a wireless communication network 16. The computer device 12 is connected to the wireless communication network by a communication link 13, which can be any one of several types of communication links known to those of ordinary skill, including hardwired and wireless communication links. The computer device 12 includes a saving module 18, a sending module 20 and a send trigger module 22. The handheld device 14 includes a drafts folder module 24.

The computer device 12 can include any number of computer systems, such as a desktop computer, a laptop computer, or even another handheld device. The computer device 12 can also include a network server connected to a desktop computer via a local-area network ("LAN"). The handheld device 14 can include any mobile computer system capable of processing an email message, such as a cellular handset or personal digital assistant.

The wireless data communication network 16 can include any one of several personal communications services, such as the second generation (2G) systems Digital Advanced Mobile Phone System (D-AMPS), Global System for Mobile communication (GSM) and Code Division Multiple Access (CDMA), the 2.5G systems Enhanced Data rates for GSM Evolution (EDGE) and General Packet Radio Service (GPRS), and 3G or higher generation systems that will replace these.

The saving module 18 includes software and/or hardware to allow a user to save an email message on the computer device 12 as a draft in a drafts folder. For example, many email programs allow a text message to be saved as a draft that can be modified or sent at a later time. This feature also allows a user to work offline while preparing an email draft. Later, after connecting to an appropriate communication network, the email message may be sent to a particular destination. The email program may also contain a "sent folder," which contains copies of emails sent to a recipient.

A user writes a draft of an email on the computer device 12 and saves it therein using the saving module 18. Subsequently, the send trigger module 22 in the computer device 12 issues instructions that cause the sending module 20 to send the draft from the computer device 12 to the handheld device 14.

These instructions are initiated by the computer device 12, and are unsolicited by the handheld device 14. In other words, the draft is "pushed" not "pulled" to the handheld device 14. When the handheld device 14 receives the draft, the drafts folder module 24 stores the draft in a drafts folder (not shown).

In the description so far, different functions were ascribed to the computer device 12 and the handheld device 14. In particular, in the embodiment described above with reference to FIG. 1, the computing device 12 is used to write the draft of the email. Subsequently, the draft is pushed to the handheld device 14. In a different embodiment, the roles of the computer device 12 and the handheld device 14 can be swapped so that it is the handheld device 14 that is used to complete a draft. The completed draft may then be pushed to the computer device 12.

In yet another embodiment of the present invention, the roles of the computer device 12 and the handheld device 14 are blurred in so far as both devices can perform similar functions. Thus, the first half of an email draft can be completed on the computer device 12 and then pushed to the handheld device 14 where the second half is completed before the whole draft gets pushed back to the computer device 12.

Figure 2:
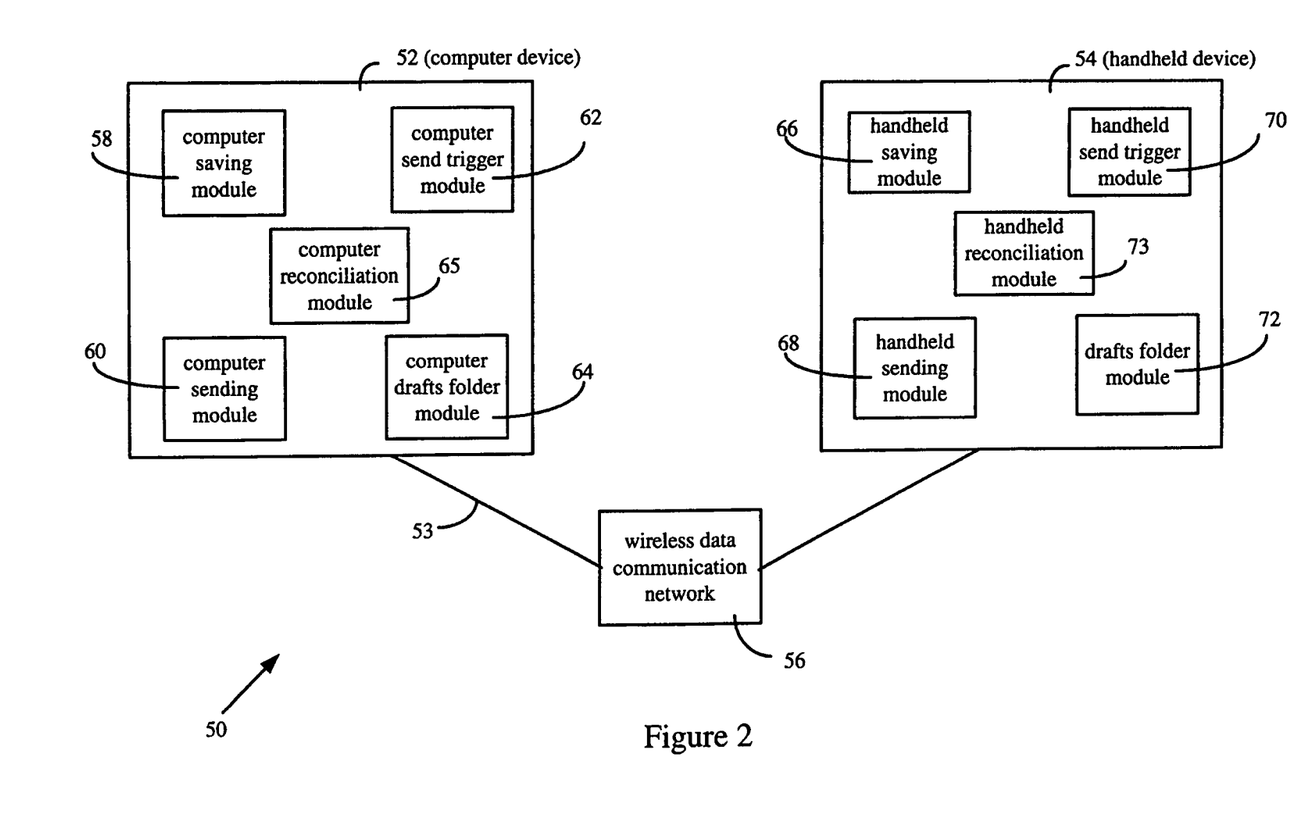
FIG. 2 shows a block diagram of a system that is representative of an embodiment in which a computer device and a handheld device can both be used to write a draft of an email.

FIG. 2 shows a block diagram of a system 50 that is representative of this last type of embodiment in which a computer device and a handheld device can both be used to write a draft of an email. The system 50 provides appropriate synchronization of the draft between the computer device and the handheld device. In particular, the system 50 includes a computer device 52 in communication with a handheld device 54 via a wireless data communication network 56. The computer device 52 is connected to the wireless data communication network 56 via a communication link 53, which can include either a hardwired link or a wireless link. In the latter case, the computer device 52 would also be a handheld device. The computer device 52 includes a computer saving module 58, a computer sending module 60, a computer send trigger module 62, a computer drafts folder module 64, and a computer reconciliation module 65. The handheld device 54 includes a handheld saving module 66, a handheld sending module 68, a handheld send trigger module 70, a handheld drafts folder module 72 and a handheld reconciliation module 73.

As described above, the computer device 52 can include any number of computer systems, such as a desktop computer, a laptop computer, another handheld device, or a network server connected to a desktop computer via a local-area network ("LAN"). The handheld device 54 can include any mobile computer system capable of processing an email message, such as a cellular handset or personal digital assistant.

The saving modules 58 and 66 include software and/or hardware to allow a user to save an email message on the computer device 52 and handheld device 54, respectively, as a draft. For example, several email programs are capable of saving messages in a drafts folder until a user chooses to optionally modify and then send the draft as an email.

In one embodiment, a user creates a draft of an email on the computer device 52 and saves it therein using the computer saving module 58. Subsequently, the computer send trigger module 62 in the computer device 52 issues instructions that cause the computer sending module 60 to send the draft from the computer device 52 to the handheld device 54. These instructions are initiated by the computer device 52, and are unsolicited by the handheld device 54. Thus, the draft is "pushed" not "pulled" to the handheld device 54. When the handheld device 54 receives the draft, the handheld drafts folder module 72 stores the draft in a drafts folder. The computer and handheld reconciliation modules 65 and 73 reconcile various versions of drafts. For example, due to delays associated with the wireless network 56, the user may modify the draft on the handheld device 54, and then modify the draft on the computer device 52 prior to the computer device 52 receiving the draft from the handheld device 54. In this case, the computer reconciliation module 65 determines which draft is more recent, ignores the older version of the draft and saves the newer version.

Figure 3A:
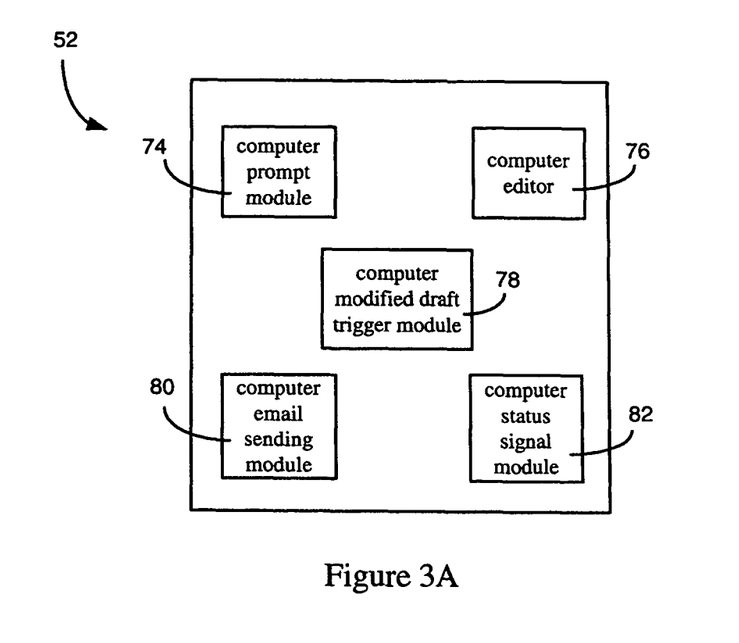
FIGS. 3A and 3B show block diagrams of the computer device and the handheld device of FIG. 2.
Figure 3B:
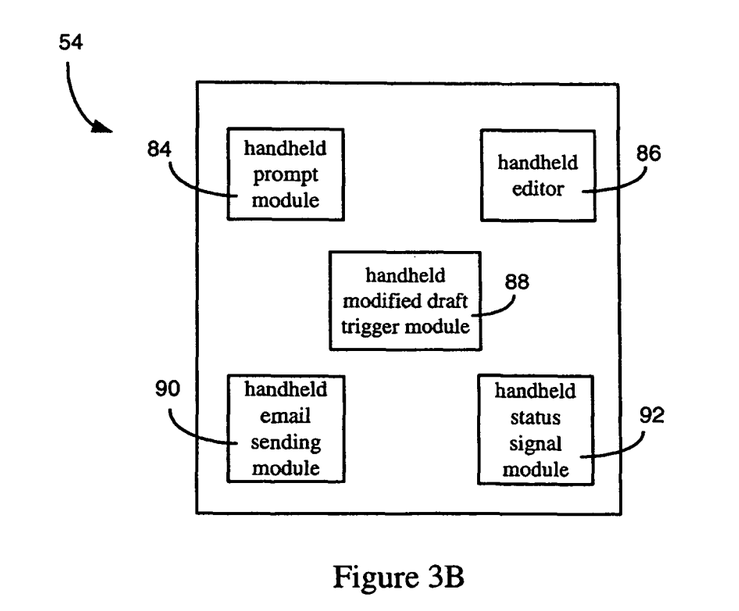

FIGS. 3A and 3B show block diagrams of the computer device 52 and the handheld device 54 of FIG. 2. The computer device 52 further includes a computer prompt module 74, a computer editor 76, a computer modified draft trigger module 78, a computer email sending module 80 and a computer status signal module 82.

The handheld device 54 further includes a handheld prompt module 84, a handheld editor 86, a handheld modified draft trigger module 88, a handheld email sending module 90 and a handheld status signal module 92.

In one embodiment, before the computer send trigger module 62 in the computer device 52 issues instructions that cause the computer sending module 60 to send the draft from the computer device 52 to the handheld device 54, the computer prompt module 74 prompts the user. In particular, when the user saves the email message as a draft using the computer saving module 58, the computer prompt module 74 prompts the user with a question such as "Do you wish to send a copy of the draft to the handheld device?" If the user answers in the affirmative, the computer send trigger module 62 issues the instructions to the computer sending module 60, otherwise no copy of the draft is sent to the handheld device 54.

The user can write a draft of an email on the desktop 52. The user may then save the uncompleted draft thereon. Subsequently, the user may log on to the handheld device 54. According to the principles of the present invention outlined above, the draft, which is created and saved on the desktop, is sent to the handheld device 54. Subsequently, the user can make modifications to the draft using a handheld editor 86 on the handheld device 54.

The user can save the modified draft on the handheld device 54. Subsequently, the handheld modified draft trigger module 88 issues instructions that cause the handheld sending module 68 to send a copy of the modified draft to the computer device 52. These instructions are initiated by the handheld device 54 without being solicited by the computer device 52. In other words, the modified draft is "pushed" not "pulled" from the handheld device to the computer device 52. Optionally, the handheld prompt module 84 can prompt the user to determine whether the modified draft should be sent to the computer device 52.

Alternatively, after the draft is sent from the computer device 52 to the handheld device 54, the user can choose to send the draft as an email to a recipient without modifying the draft. For this purpose, the handheld email sending module 90 includes software and/or hardware for sending the draft as an email to a recipient. For example, the email sending module 90 includes a field where an email address can be entered by a user, and means to send the email to a recipient having that email address, such as by using a mouse to click a "send" icon.

After the email is sent from the handheld device 54, the handheld status signal module 92 in the handheld device 54 sends a signal to the computer device 52 to indicate that the email has been sent.

In the embodiment shown in FIG. 2, components of the computer device 52 have analogs in the handheld device 54 and perform similar roles. For example, in the description provided above, a user creates a draft using the computer device 52. The computer device 52 then sends a copy of the draft to the handheld device 54, where it is modified. The handheld device 54 then sends a copy of the modified draft to the computer device 52 and subsequently sends the modified draft to the recipient. The steps performed by the computer and handheld devices can be swapped. To wit, the user can create a draft of an email on the handheld device 54 and save it thereto using the handheld saving module 66. Subsequently, the handheld send trigger module 70 issues instructions that cause the handheld sending module 68 to push the draft from the handheld device 54 to the computer device 52. Optionally, these instructions are issued after the user is prompted by the handheld prompt module 84 and answers affirmatively. Upon receipt, the computer drafts folder module 64 stores the draft in a drafts folder. Modifications to the stored draft can be made on the computer device 52 using the computer editor 76. The user can then save the modified draft on the computer device 52. Subsequently, the computer modified draft trigger module 78 issues instructions that cause the computer sending module 60 to push a copy of the modified draft to the handheld device 54. Optionally, the computer prompt module 74 can prompt the user first. In one embodiment, the modified draft trigger modules 78 and 88 can detect changes to a draft folder either by constantly polling or through the use of notification events, such as a change to the draft folder. The modified draft trigger modules 78 and 88 can handle notifications of changes and/or can poll for changes. When a change is detected (through either method), the change is then sent to the respective sending modules to be packaged and sent across the wireless network.

Alternatively, after the draft is sent from the handheld device 54 to the computer device 52, the user can choose to send the draft as an email to a recipient without modifying the draft. For this purpose, the computer email sending module 80 is used for sending the draft as an email to a recipient.

It should be understood that various permutations are possible in which one of the many components is present in the computer device 52, but absent in the handheld device 54, or vice versa. For example, the computer device 52 may not have the computer prompt module 74, but the handheld device 54 may have the handheld prompt module 84. Or the handheld device may not have a handheld editor 86. In such an embodiment, the handheld device 54, lacking a handheld editor 86, is used to read or forward messages, but not to compose or modify drafts.

Figure 4:
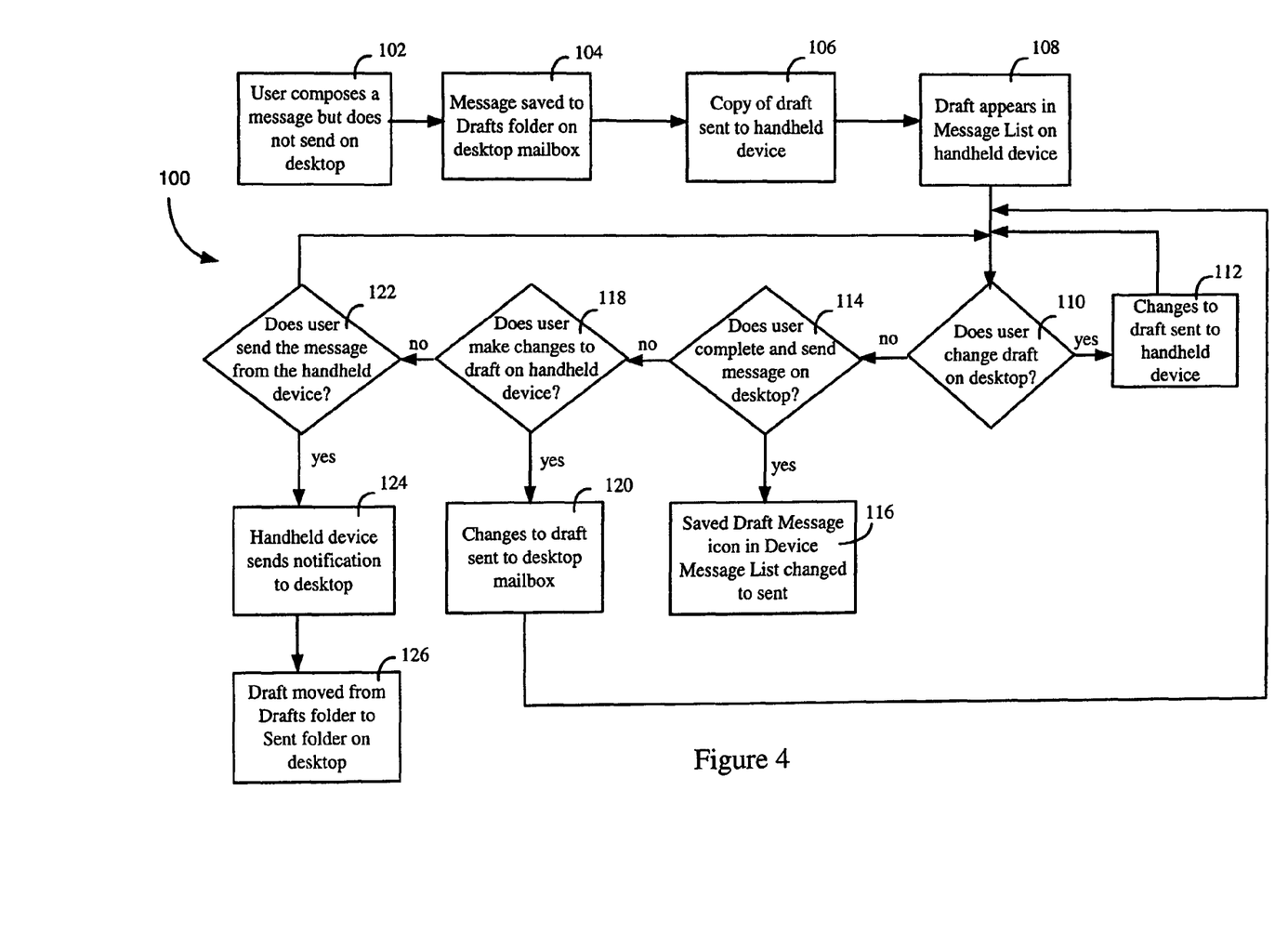
FIG. 4 shows a flowchart for synchronizing an email draft composed on the computer device.

FIG. 4 shows a flowchart 100 for synchronizing an email draft composed on a particular type of computer device 52, viz., a desktop. In step 102, a user composes an email message on the computer device 52, but does not send the email message at this point. Instead, in step 104, the user saves the email message with the computer saving module 58. The draft, for example, can be saved to the drafts folder on the desktop of the computer device 52. In step 106, the computer sending module 60 sends a copy of the draft to the handheld device 54. In step 108, after the handheld device 54 receives the draft, the draft appears in a message list that contains messages for the user of the handheld device 54. The handheld drafts folder module 72 can store the copy of the draft in the drafts folder of the handheld device 54.

In step 110, a branch in the flow occurs based on whether the user employs the computer editor 76 to modify the draft. If the draft is modified, flow transfers to step 112, where the modified draft is sent by the computer sending module 60 from the computer device 52 to the handheld device 54. This sending process is repeated whenever the draft is modified on the computer device 52, thus synchronizing the drafts on the two devices 52 and 54, as needed. If the draft is not modified, the flow transfers to step 114, where another branch in the flow occurs that depends on whether the user completes the draft and then sends the draft with the computer email sending module 80. If the draft is sent, the computer status signal module 82 sends a signal to the handheld device 54, and, in step 116, the saved draft in the handheld device is identified with an icon indicating that the draft has been sent. Returning to step 114, if the message is not sent, flow transfers to step 118. At step 118, if the user uses the handheld editor 86 of handheld device 54 to modify the draft, the handheld sending module 68 sends a copy of the modified draft to the computer device 52 in step 120. If no changes are made, then the flow transfers to step 122, which is another branch point. There, subsequent flow depends on whether the user sends the email to an intended recipient from the handheld device 54. If the email is sent, the handheld status signal module 92 sends a signal to the computer device 52 indicating that the message was sent in step 124. In step 126, the computer device 52 can then move the message from the drafts folder to a sent folder where copies of emails sent to a recipient are stored. If the user does not send the message, the flow returns to step 110 from step 122, whence several more iterations of draft modifications and synchronizations can be initiated. The loop involving steps 110 and 112 is terminated when the draft is sent to the intended recipient. If step 122 occurs, so too does step 116. When the user sends the draft from the handheld device 54, the icon is changed to 'sent.' Similarly, if step 114 occurs, so too does step 126. When a user sends a draft from the computer device 52, the draft may be stored in the sent folder. If the draft is not stored in the sent folder, then the draft is deleted at the computer device 52. The action of storing the draft in the sent folder when it is sent may be made configurable by the user.

Figure 5:
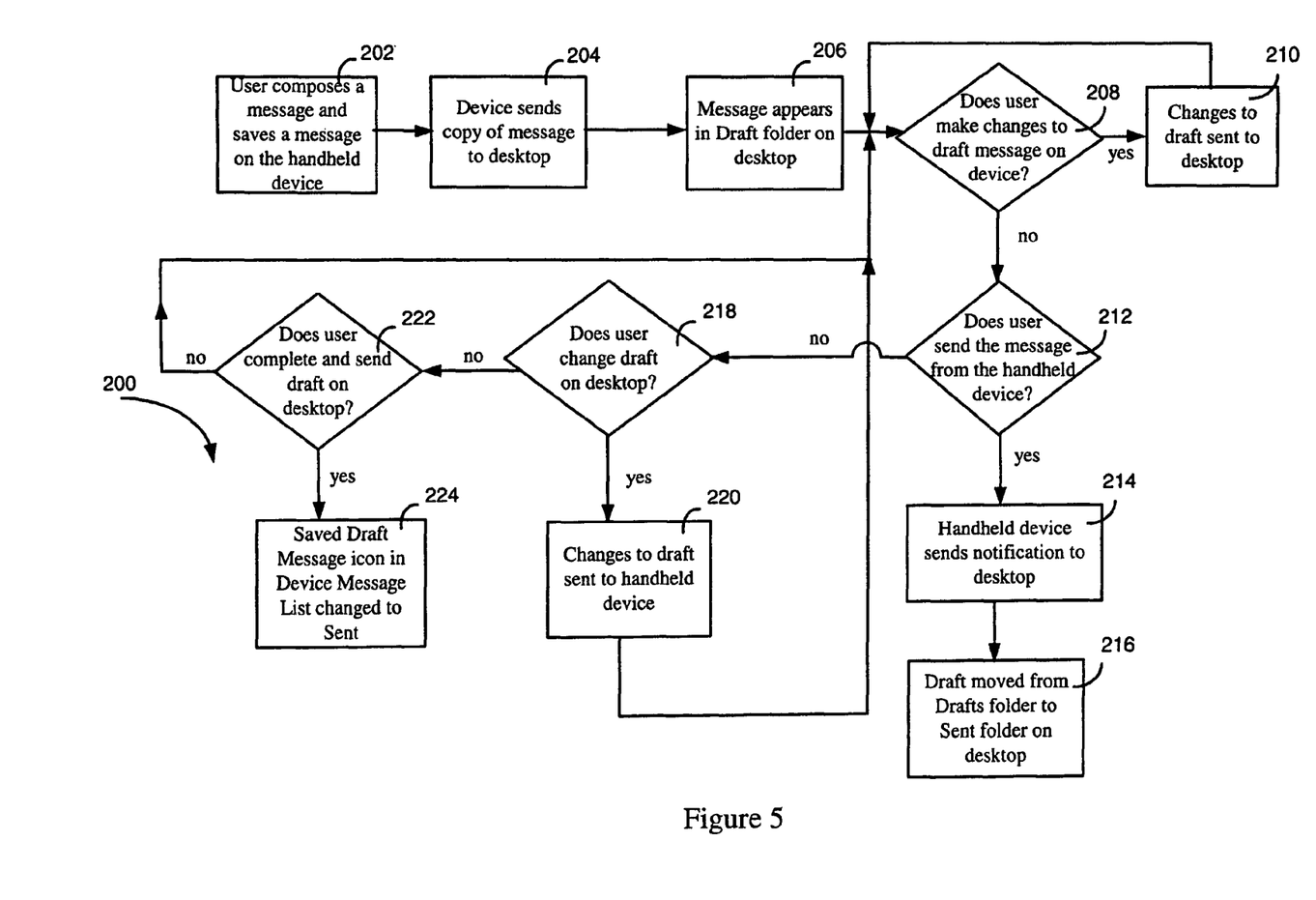
FIG. 5 shows a flowchart for synchronizing an email draft composed on the handheld device.

FIG. 5 shows a flowchart 200 for synchronizing an email draft composed on a handheld device. In step 202, a user composes an email message on the handheld device 54, but does not send the email message at this point. Instead, the user saves the email message with the handheld saving module 66. For example, the handheld drafts folder module 72 can save the draft in a drafts folder of the handheld device 54. In step 204, the handheld sending module 68 sends a copy of the draft to the computer device 52. In step 206, after the computer device 52 receives the draft, the draft appears in the drafts folder of the computer device 52.

Step 208 is a branch of the flow that depends on whether the user modifies the draft on the handheld device 54. If such changes are made, the handheld send trigger module 70 sends instructions to the handheld sending module 68 that cause a copy of the modified draft to be sent to the computer device in step 210. If no such changes are made, the flow proceeds to step 212, which is another branch point at which a decision is made as to whether the message is sent by the handheld email sending module 90 to an intended recipient. If the message is sent, then, in step 214, the handheld status signal module 92 sends a signal to the computer device 52 indicating that the message was sent. The computer device 52 can then move the message from the drafts folder to the sent folder in step 216. If the message is not sent, then the flow proceeds to step 218, which is another branch point that branches according to whether the user modifies the draft on the computer device 52 with the computer editor 76. If such modifications are made, then the computer modified draft trigger module 78 issues instructions that cause the computer sending module 60 to send a copy of the modified draft to the handheld device 54 in step 220. If no such modifications are made, then the flow transfers to another branch point in step 222 that branches according to whether the user completes and sends the message as an email from the computer device 52 with the computer email sending module 80. If the message is sent, the computer status signal module 82 sends a signal to the handheld device 54 that indicates that the message has been sent. In response, the handheld device 54 can indicate that the message has been sent by changing an icon in the handheld device message list to "sent" in step 224. If the message is not sent, the flow returns to step 208, whence subsequent modifications and synchronizations of the draft can be initiated. If step 222 occurs, so too does step 216. Likewise, if step 212 occurs, so too does step 224.

It should be understood that the computer sending module 60 and the handheld sending module 68 can synchronize the draft, by sending the draft to the other device, after the user is prompted. Alternatively, the synchronization can occur without prompting. In such case, the synchronization can occur automatically after a draft is stored on one device. In another embodiment, the computer device 52, for example, can scan the drafts folder at fixed intervals of time. Each draft in the drafts folder can have an associated data set that indicates when a copy of the draft file was sent to the handheld device 54, if at all, and when the last modification to the draft file occurred on the computer device 52. If the modification occurred after the copy of the draft file was sent (or if no copy was ever sent) to the handheld device 54, then the computer sending module 60 would send a copy of the draft file to the handheld device 54. These steps can also be implemented with the computer device 52 and the handheld device 54 changing roles. Thus, the handheld device 54 can be the device that first scans its draft folder file.

Having described in detail the preferred embodiments of the present invention, including the preferred methods of operation, it is to be understood that this operation could be carried out with different elements and steps. This preferred embodiment is presented only by way of example and is not meant to limit the scope of the present invention, which is defined by the following claims.

What is claimed is:

1. A system for synchronizing a draft of an email, the system comprising:
a computer device;
a handheld device in communication with the computer device;
a saving module located in one device chosen from the group consisting of the computer device and the handheld device to allow a user to save an email message therein as a draft;
a sending module in the one device for sending the draft therefrom to the other device of the group; and
a send trigger module in the one device for issuing instructions, which are unsolicited by the other device, that cause the sending module to send the draft from the one device to the other device in response to the email message being saved as a draft;
and wherein the handheld device comprises an e-mail sending module for sending a draft received from the computer device to a recipient over a wireless network.

2. The system of claim 1, further comprising a prompt module in the one device for prompting the user to determine whether the send trigger module is to issue the instructions.

3. The system of claim 1, further comprising
an editor in the computer device for modifying the draft to create a modified draft; and
a modified draft trigger module in the computer device for issuing second instructions, which are unsolicited by the handheld device, that cause the computer device to send the modified draft from the computer device to the handheld device.

4. The system of claim 3, further comprising
an email sending module in the computer device for sending the draft as an email from the computer device to a recipient; and
a status signal module in the computer device for sending a signal to the handheld device to indicate that the email has been sent.

5. The system of claim 3, further comprising
a status signal module in the handheld device for sending a signal to the computer device to indicate that the email has been sent by the e-mail sending module of the handheld device.

6. The system of claim 1, further comprising
an editor in the handheld device for modifying the draft to create a modified draft; and
a modified draft trigger module in the handheld device for issuing second instructions, which are unsolicited by the handheld device, that cause the handheld device to send the modified draft from the handheld device to the computer device.

7. The system of claim 6, further comprising
a status signal module in the handheld device for sending a signal to the computer device to indicate that the email has been sent by the e-mail sending module of the handheld device.

8. The system of claim 1, further comprising a wireless data communication network to allow the handheld device to be in communication with the computer device.

9. The system of claim 1, further comprising
an email sending module in the computer device for sending the draft as an email from the computer device to a recipient; and
a status signal module in the computer device for sending a signal to the handheld device to indicate that the email has been sent.

10. The system of claim 1, further comprising a reconciliation module that reconciles various versions of the draft.

11. A method of synchronizing a draft of an email between a computer device and a handheld device, the method comprising:
a user saving an email message as a draft on one device chosen from the group consisting of a computer device and a handheld device;
sending the draft from the one device to the other device of the group in response to commands issued by the one device that are unsolicited by the other device, wherein the commands are issued in response to the email message being saved as a draft; and
sending the draft received at the handheld device from the computing device to a recipient over a wireless network.

12. The method of claim 11, further comprising, before the step of sending, prompting the user to determine whether to send the draft.

13. The method of claim 11, further comprising
the user modifying the draft with the computer device; and
sending the modified draft from the computer device to the handheld device, in response to second commands issued by the computer device that are unsolicited by the handheld device.

14. The method of claim 13, further comprising
the user sending the draft as an email from the computer device to a recipient; and
the computer device sending a signal to the handheld device to indicate that the email has been sent.

15. The method of claim 13, further comprising
the handheld device sending a signal to the computer device to indicate that the email has been sent from the handheld device.

16. The method of claim 11, further comprising
the user modifying the draft with the handheld device; and
sending the modified draft from the handheld device to the computer device, in response to second commands issued by the handheld device that are unsolicited by the computer device.

17. The method of claim 16, further comprising
the user sending the draft as an email from the computer device to a recipient; and
the computer device sending a signal to the handheld device to indicate that the email has been sent.

18. The method of claim 16, further comprising
the handheld device sending a signal to the computer device to indicate that the email has been sent from the handheld device.

19. The method of claim 11, wherein, in the step of the user sending, the computer device is a desktop computer.

20. The method of claim 11, wherein the step of sending includes opening a communication link between the computer device and the handheld device via a wireless data communication network.

21. The method of claim 20, further comprising reconciling various versions of the draft with a reconciliation module.

22. A non-transitory computer readable medium having computer instructions for synchronizing a draft of an email message, the instructions for performing the acts of:
saving an email message as a draft on one device chosen from the group consisting of a computer device and a handheld device;
sending the draft from the one device to the other device of the group in response to commands issued by the one device that are unsolicited by the other device, wherein the commands are issued in response to the email message being saved as a draft; and sending the draft received at the handheld device from the computing device to a recipient over a wireless network.

23. The system of claim 1, further comprising
a status signal module in the handheld device for sending a signal to the computer device to indicate that the email has been sent by the e-mail sending module of the handheld device.

24. The method of claim 11, further comprising
the handheld device sending a signal to the computer device to indicate that the email has been sent from the handheld device.

* * * * *